United States Patent [19]

Maring et al.

[11] 3,766,524

[45] Oct. 16, 1973

[54] DYNAMIC TIME SLICING CONTROL FOR MICROPROGRAMMED CONTROLLER

[75] Inventors: Blayne E. Maring; James G. Nicholson; Lynn M. Rust, all of Rochester, Minn.

[73] Assignee: International Business Machines Corporation, Armonk, N.Y.

[22] Filed: June 30, 1971

[21] Appl. No.: 158,324

[52] U.S. Cl. .............................................. 340/172.5
[51] Int. Cl. .............................................. G06f 9/18
[58] Field of Search .................................. 340/172.5

[56] References Cited

UNITED STATES PATENTS

| | | | |
|---|---|---|---|
| 3,573,741 | 4/1971 | Gavril | 340/172.5 |
| 3,510,843 | 5/1970 | Bennett et al. | 340/172.5 |
| 3,408,632 | 10/1968 | Hauck | 340/172.5 |
| 3,409,880 | 11/1968 | Galler et al. | 340/172.5 |
| 3,626,385 | 12/1971 | Bouman | 340/172.5 |
| 3,490,003 | 1/1970 | Herold et al. | 340/172.5 |
| 3,629,846 | 12/1971 | Thompson | 340/172.5 |
| 3,639,909 | 2/1972 | Hauck et al. | 340/172.5 |

*Primary Examiner*—Gareth D. Shaw
*Attorney*—Robert W. Lahtinen, Carl W. Laumann, Jr. and J. Jancin, Jr.

[57] ABSTRACT

A plurality of independent addressing devices are dynamically assigned instruction cycles. The addressing devices each address a common addressable data storage unit. Logic circuitry is provided to generate status signals indicating which addressing device is active during a present instruction cycle. Other logic circuitry is responsive to interrupt requests to generate signals indicating the status of competing interrupts. Instruction cycle assignment circuitry is responsive to the active address device status signals and the interrupt status signals to generate signals for selecting the addressing device which is to be assigned the next instruction cycle.

8 Claims, 4 Drawing Figures

INVENTORS
BLAYNE E. MARING
JAMES O. NICHOLSON
LYNN M. RUST
BY Sughrue, Rothwell, Mion, Zinn & Macpeak
ATTORNEYS

DYNAMIC TIME SLICING CONTROL FOR MICROPROGRAMMED CONTROLLER

BACKGROUND OF THE INVENTION

1. Field of the Invention

The invention relates generally to electronic data processing systems and more particularly to dynamic allocation of instuction cycles to a plurality of addressing devices for addressing an addressable storage unit.

2. Description of the Prior Art

The prior art techniques do not dynamically assign instruction cycles to addressing devices. Rather, they pre-allocate instruction cycles to the addressing devices on a basis to handle worse case interrupt arrival patterns. In this invention, the instruction cycles are dynamically allocated to a plurality of independent addressing devices based upon which addressing device is active during a present instruction cycle and the status of competing interrupts during that instruction cycle.

SUMMARY OF THE INVENTION

The invention is an improved method and apparatus for dynamically assigning instruction cycles, one at a time, to one of a plurality of independent addressing devices for addressing an addressable storage unit. The assignment of instruction cycles is based upon which addressing device is active during a present instruction cycle and the status of competing interrupts during that instruction cycle.

The invention finds particular utility in controllers for Input/Output devices for a data processing system. The controllers contain control programs for the Input/Output devices. ACcording to this invention, multiple control programs can be stored in a single control storage unit within the controller. The control programs are in microprogram form and are selected by the addressing devices. The control programs may be unique or common to particular Input/Output devices. For example, the control program for operating certain functions of a data card reader would be unique to the card reader whereas the control program for operating certain functions of a data card punch would be unique to the card punch. Yet, control programs for controlling functions common to both card reader and card punch are used commonly by both devices.

The instruction cycles for the addressing devices for selecting these control programs are allocated on a time slice basis. One of the Input/Output devices may be operating continuously such as in a non-interrupt mode. When this occurs, instruction cycles are continously allocated to the addressing device for selecting the control program in storage for controlling that Input/Output device. However, two Input/Output devices may both be requesting service on an interrupt basis. When this occurs, the addressing devices for selecting the associated control programs are allocated instruction cycles alternately. Hence, it is seen that the instruction cycles are dynamically allocated to the addressing devices in accordance with the needs of the Input/Output devices to be controlled. In this manner, a single control unit can be used for a plurality of Input/Output devices and the resources of the control unit, i.e., the control programs are selected dynamically according to the needs of the devices being controlled. Since the instruction cycles are dynamically allocated, there is no need to predetermine interrupt patterns. Hence, the present invention is more economical and more flexible. The interrupt patterns can take place in any sequence and the requirements thereof will be met by the present invention.

A principal object of the invention is to provide an improved method and apparatus for dynamically allocating instruction cycles to addressing devices which:

a. is relatively inexpensive;

b. does not require predetermination of interrupt patterns;

c. is flexible to meet the servicing requirements of a plurality of Input/Output devices;

d. avoids excessive software polling for conditions requiring high speed service; and e. is generally useful in a data processing system.

BRIEF DESCRIPTION OF THE PREFERRED EMBODIMENTS

Figure 1:
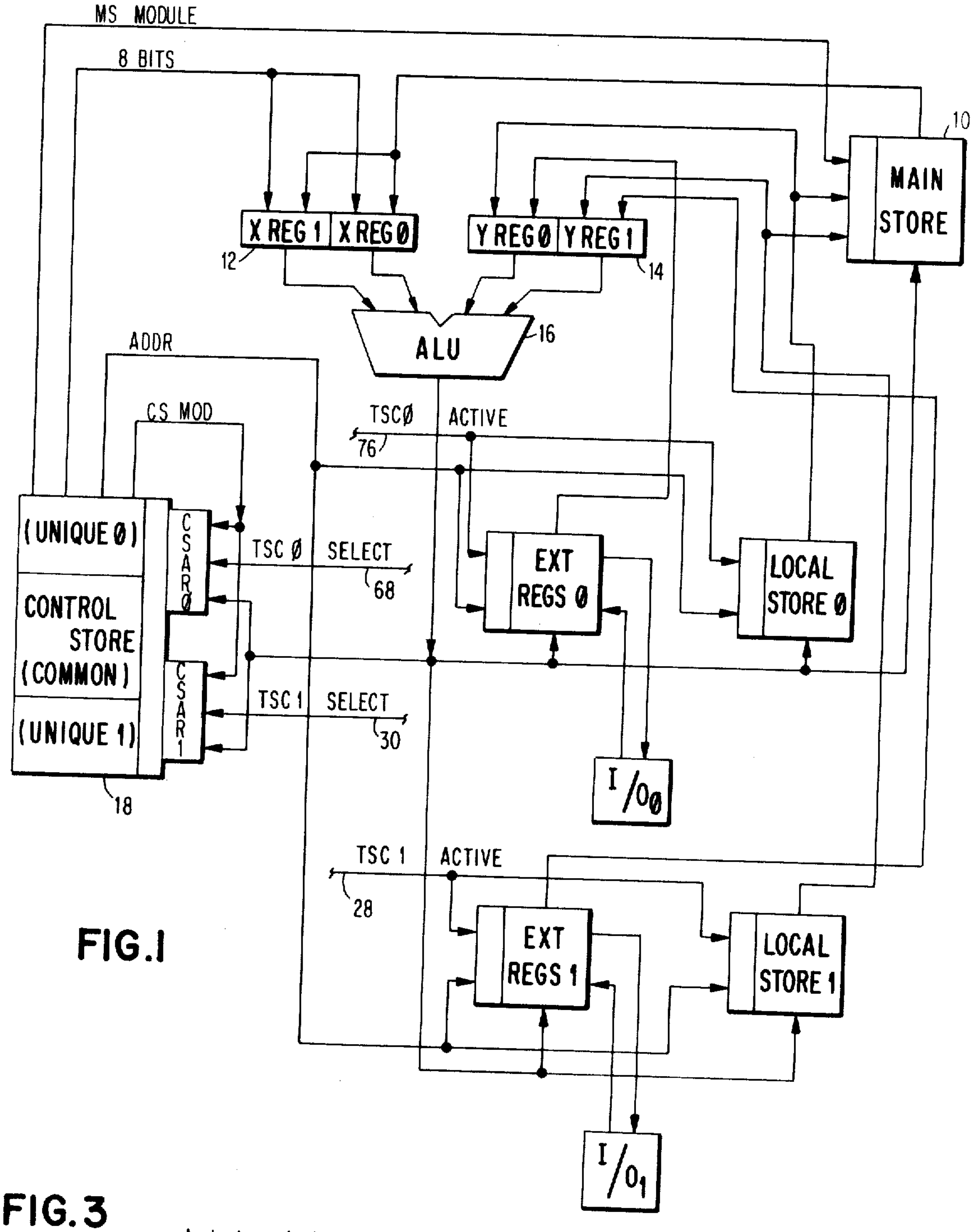
FIG. 1 is a block diagram of a data processing system employing the dynamically time-sliced microprogrammed controller of this invention.

FIG. 1 is a data flow block diagram of a data processing system including a microprocessor or mircoporgrammed controller designed to operate in accordance with the principles of the invention. The basic elements of the processing system are a Main Store 10, X and Y Data Registers (X Reg and Y Reg) 12 and 14, an Arithmetic and Logic Unit (ALU) 16, a microprogrammed Control Store 18, and a plurality of Input/Output (I/O) vices, only two of which are shown and are labeled $I/O_0$ and $I/O_1$. Also included are two Control Store Address Registers $CSAR_0$ and $CSAR_1$ associated with $I/O_0$ and $I/O_1$, respectively. Also associated with each I/O device are corresponding addressable Exhernal Registers (Ext Regs) and a Local Store also containing addressable registers.

The Control Store 18 contains a plurality of microprograms or sets of instructions for controlling and monitoring the operations of the two I/O devices, $I/O_0$ and $I/O_1$. These microprograms are of three types: (1) Those unique to $I/O_0$; (2) Those unique to $I/O_1$; and (3) Those common to both $I/O_0$ and $I/O_1$. In an exemplary form of the invention, $I/O_0$ is a punched card reader and $I/O_1$ is a card puncher.

When $I/O_0$ has a high priority interrupt service request for the Control Store 18, a Time Slice Control signal TSCO SELECT is applied to the register $CSAR_0$ to address the proper microprogram in the Control Store 18 and associate it with $I/O_0$. The corresponding select signal for $CSAR_1$ is designated TSC1 SELECT. The corresponding External Register or Local Store Register is gated by a Time Slice Control Active signal (TSC ACTIVE), e.g., this signal for $I/O_0$ is designated TSC0 ACTIVE, and the corresponding signal for $I/O_1$ is designated TSC1 ACTIVE.

FIG. 1 illustrates the various data flow paths between the various components of the data processing system. In one form of the invention, the Control Store 18 is normally servicing I/$O_1$ in a low priority service mode which is not interrupt driven. In this mode, for example, I/$O_1$ may be making data manipulations, such as serial-to-parallel and parallel-to-serial conversions. However, the need of I/$O_0$ to use the Control Store 18 is always initiated by some type of hardware or software interrupt. Hardware interrupts, such as a channel request, are external interrupts from anywhere in the system, and software interrupts are generated by the Control Store in response to continuous monitoring or polling of the External Registers to determine when there is a need for an interrupt.

When I/$O_0$ issues an interrupt, the subsequent instruction cycles of Control Store 18 are assigned to service I/$O_0$ on a full time basis. However, I/$O_1$ may also issue an interrupt for a high priority service request when I/$O_0$ and I/$O_1$ are simultaneously issuing interrupts for high priority service, then the dynamic time slicing control of this invention alternately assigns consecutive instruction cycles of Control Store 18 to I/$O_0$ and I/$O_1$ which thereby equally time share the Control Store. Each microprogram in Control Store 18 issues a reset command to turn off its time slice when the requested service has been completed. Furthermore, this time sharing mode is inhibited during skip or branch instructions. It should be noted, however, that design modifications would allow time slicing to occur during skip or branch instructions.

Figure 2:
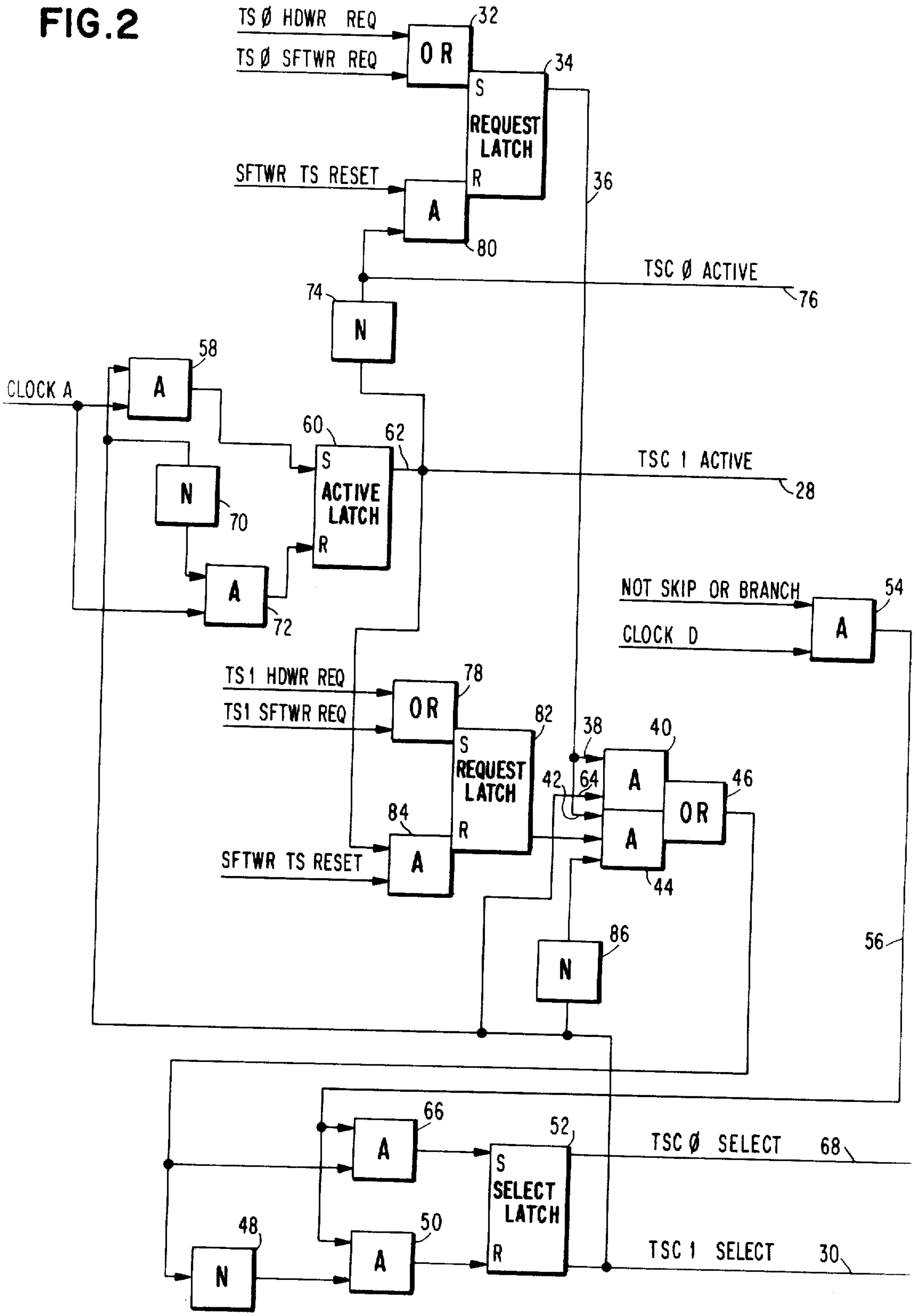
FIG. 2 is a block diagram of the details of a logic circuit for generating certain control signals used for dynamically controlling the time slicing of the controller illustrated in FIG. 1.

FIG. 2 is a block diagram of one form of a logic circuit for producing the signals TSC0 SELECT, TSC1 SELECT, TSC0 ACTIVE and TSC1 ACTIVE shown in FIG. 1.

Figure 3:
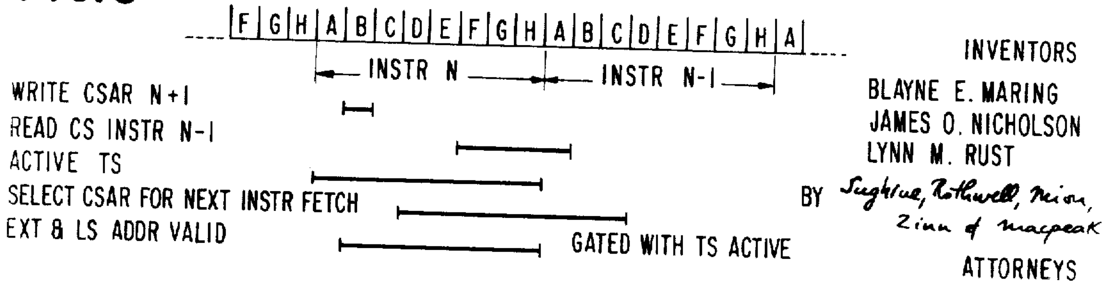
FIG. 3 is a timing diagram showing the eight clock times in a machine cycle.

FIG. 3 illustrates the eight clock pulses, designated A, B ... H, of one machine cycle of the data processing system illustrated in FIG. 1. This machine cycle may also be considered as one instruction cycle for the Control Store 18. Clock pulses A and D are of interest with respect to the present invention.

The following Truth Table summarizes the operation of the logic circuit of FIG. 2.

TRUTH TABLE NO. 1

| | Present Active State | | Service Request | | Next Active State | |
|---|---|---|---|---|---|---|
| | TS0 | TS1 | TS0 | TS1 | TS0 | TS1 |
| 1 | 1 | 0 | 0 | 0 | 0 | 1 |
| 2 | 1 | 0 | 0 | 1 | 0 | 1 |
| 3 | 1 | 0 | 1 | 0 | 1 | 0 |
| 4 | 1 | 0 | 1 | 1 | 0 | 1 |
| 5 | 0 | 1 | 0 | 0 | 0 | 1 |
| 6 | 0 | 1 | 0 | 1 | 0 | 1 |
| 7 | 0 | 1 | 1 | 0 | 1 | 0 |
| 8 | 0 | 1 | 1 | 1 | 1 | 0 |

The following detailed operation of the circuit of FIG. 2 is presented to show that this operation conicides with the above Truth Table.

In this embodiment of the invention, it is assumed that Control Store 18 is presently servicing I/$O_1$ in a low priority or non-interrupt driven mode which will also be called the normal mode. For the present instruction cycle then, the signal TSC1 ACTIVE appears on line 28 from clock time A through clock time H to gate Ext Regs 1 and Local Store 1. Furthermore, the signal TSC1 SELECT appears on line 30 from clock time D of the preceding cycle to clock time D of the present cycle. If no interrupt or service request is present from I/$O_0$ at clock time D of the present cycle, then TSC1 SELECT remains up to select CSAR1 for the following cycle.

The circuit of FIG. 2 implements the normal mode as follows. If there is no service request or interrupt command from I/$O_0$, then neither of the signals TS0 HRDW REQ or TS0 SOFTWARE REQ is present at the two inputs of OR circuit 32, and, therefore, Request Latch 34 remains in its reset or R state, and its output is down, i.e. there is no signal on line 36. Consequently, the input 38 of AND circuit 40 and the input 42 of AND circuit 44 are both down, so that the output of OR circuit 46 is also down. However, the inverter or NOT circuit 48 raises the lower input of AND circuit 50 which is connected to the reset terminal R of the Select Latch 52.

At clock time D of the present cycle, in the absence of a skip or branch instruction, AND circuit 54 raises its output line 56 to raise the upper input of AND circuit 50. Consequently, the output of AND circuit 50 is raised at D time to reset Select Latch 52, or cause it to remain in its reset state if already there, thereby producing on line 30 the signal TSC1 SELECT. This signal remains up until D time of the following cycle.

At A time of the following cycle, AND circuit 58 samples line 30 to determine whether this signal is present. If it is, then the output of AND circuit 58 is raised to set the Active Latch 60, thereby producing on lines 62 and 28 the signal TSC1 ACTIVE.

Let us now assume that prior to D time an interrupt in the form of a service request from I/$O_0$ appears at one of the inputs to OR circuit 32 whose output then sets Request Latch 34 to raise line 36 and input 38 of AND circuit 40. Since the input 64 of AND circuit 40 is raised by the presence of the TSC1 SELECT signal on line 30, the output of OR circuit 46 now raises the lower input of AND circuit 66 connected to the set S terminal of Select Latch 52. The upper input of AND circuit 66 is also raised at D ACTIVE, thereby setting Select Latch 52 to produce the signal TSC0 SELECT on line 68 and removing the signal TSC1 SELECT from line 30.

At clock time A of the next cycle, the lower input of AND circuit 58 is now down. Therefore, the output of AND circuit 58 is also down, but the inverter or NOT circuit 70 raises the lower input of AND circuit 72 which is connected to the reset R terminal of Active Latch 60. Clock pulse A is applied to the upper input of AND circuit 72 so that Latch 60 is reset at A time and remains there for the duration of the instruction cycle. Consequently, the output 62 is down, and the inverter or NOT circuit 74 raises line 76 to produce thereon the signal TSC0 ACRIVE, so that I/$O_0$ is now serviced by the Control Store 18 during this instruction cycle.

As can be seen from Truth Table No. 1, the controller remains in this mode of servicing I/$O_0$ so long as a service request appears at an input of OR circuit 32 or no software TS Reset has occurred subsequent to the removal of inputs of OR circuit 32 and no interrupt or high priority service request from I/$O_1$ appears at an input of OR circuit 78. When the requested service or microprogram is completed, Control Store 18 issues a SOFTWARE TS RESET command which is applied to AND circuit 80 to reset Request Latch 34 and disable AND circuit 40. Consequently, at the next D time, Select Latch 52 will be reset to again produce on line 30 the TSC1 SELECT signal, thereby returning the controller on the next cycle to its normal mode of servicing $I/O_1$ on a lower priority basis.

Let us now assume that Request Latch 34 is set, i.e., the controller is servicing $I/O_0$ in response to a service request at an input of OR circuit 32. If a high priority service request, TS1 HRDW REQ or TS1 SOFTWARE REQ, now simultaneously appears on an input of OR circuit 78, then Truth Table No. 1 shows that consecutive time slices of Control Store 18 will be alternately assigned to $I/O_1$ and $I/O_0$.

This operation is implemented by the circuit of FIG. 2 as follows. At the beginning of the present cycle, both TSC1 ACTIVE and TSC0 SELECT are up. The service request from $I/O_1$ on the input of OR circuit 78 will set Request Latch 82, thereby lowering the center input of AND circuit 44 so that the output of this circuit is also down. Since TSC1 SELECT is not present on line 30, the input 64 of AND circuit 40 is also lowered, and the output of this circuit is also down. Consequently, the output of OR circuit 46 is down, and at D time the output of inverter 48 operates through AND circuit 50 to reset Select Latch 52 and produce on line 30 the signal TSCl SELECT to select $CSAR_1$ for the next instruction cycle. At clock time A of this next cycle, Active Latch 60 is set to produce the signal TSC1 ACTIVE on line 28 to gate Ext Regs 1 or Local Store 1 associated with $I/O_1$.

If at D time of this next cycle, service requests still appear on the inputs of both OR circuits 32 and 78, then Truth Table No. 1 shows that $CSAR_0$ will be selected for the following cycle, resulting in equal time sharing of Control Store 18 by $I/O_0$ and $I/O_1$. This operation is implemented as follows.

At clock time D, both inputs 38 and 64 of AND circuit 40 are up so that the output of OR circuit 46 is up. Therefore, the output of AND circuit 66 sets Select Latch 52 to bring up TSC0 SELECT at D time. Consequently, at clock time A of the following cycle, AND circuits 58 and 72 will reset Active Latch 60 to bring up the signal TSC0 ACTIVE on line 76, thereby gating Ext Regs 0 or Local Store 0 associated with I/O Therefore, so long as service requests from both $I/O_0$ and $I/O_1$ are simultaneously present, consecutive instruction cycles of Control Store 18 will be alternately assigned to $I/O_0$ and $I/O_1$.

When the service requested by either $I/O_0$ or $I/O_1$ is completed, Control Store 18 generates a SOFTWARE TS RESET signal. If $I/O_1$ is being serviced at this time, then the TSC1 ACTIVE signal on line 28 and the SOFTWARE TS RESET signal applied to the inputs of AND circuit 84 reset Request Latch 82. The presence of TSC1 SELECT on line 30 continues to enable AND circuit 40, but inverter 86 disables AND circuit 44. Consequently, at D time, the Select Latch 52 is set to produce TSC0 SELECT on line 68 so that TSC0 ACTIVE comes up on the next clock A pulse.

Control Store 18 will now service $I/O_0$ on a full time basis. On the next cycle, all three inputs of AND circuit 44 are up. The upper input is raised by the set condition of Request Latch 34, the center input by the reset condition of Request Latch 82, and the lower input by inverter 86.

When the service requested by $I/O_0$ is completed, the signals SOFTWARE TS RESET and TSC0 ACTIVE cooperate at the inputs of AND circuit 80 to reset Requst Latch 34. Consequently, both AND circuits 40 and 44 are disabled, and inverter 48 and AND circuit 50 will reset Select Latch 52 at the next D time to return the controller to its normal mode.

Figure 4:
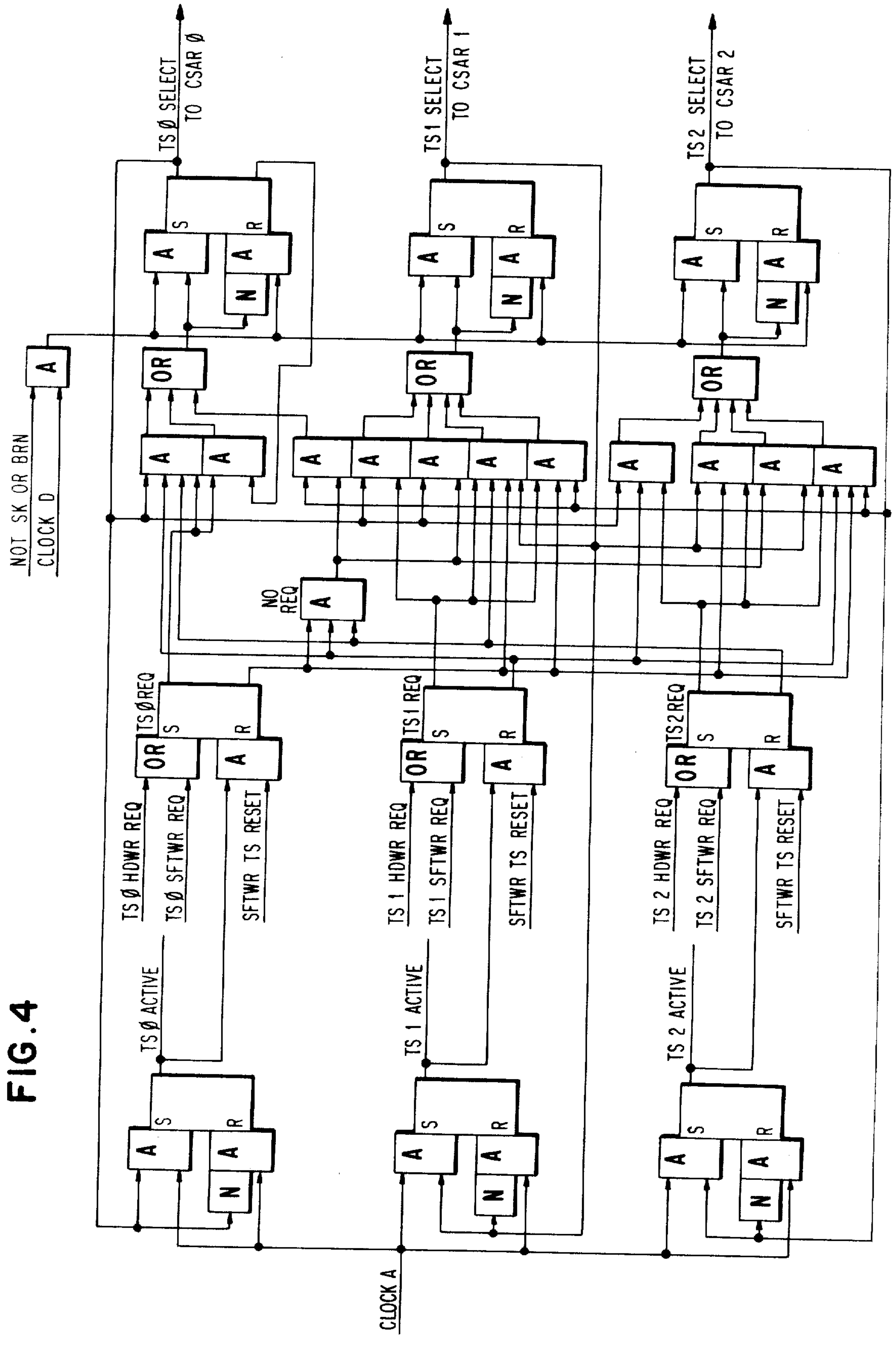
FIG. 4 is a block diagram of a logic circuit for generating the control signals necessary for dynamically time slicing the controller of FIG. 1 when three devices are contolled.

FIG. 4 illustrates one form of a logic circuit for generating the control signals for dynamic time slicing of Control Store 18 when three I/O devices are serviced by the Control Store. Referring to FIG. 1, it will be assumed that a third I/O device $I/O_2$ is included with its associated registers, such as $CASR_2$ Ext Regs 2 and Local Store 2, none of which are illustrated in FIG. 1.

The following Truth Table No. 2 summarizes the operations of the circuit of FIG. 4 in the same manner that Truth Table No. 1 summarizes the operation of the circuit of FIG. 2.

TRUTH TABLE NO. 2

| Present Active TS | | Service Request | | | Next Active TS |
|---|---|---|---|---|---|
| 14 | 0 | 0 | 0 | 0 | 1 |
| 15 | 0 | 0 | 0 | 1 | 2 |
| 16 | 0 | 0 | 1 | 0 | 1 |
| 17 | 0 | 0 | 1 | 1 | 1 |
| 18 | 0 | 1 | 0 | 0 | 0 |
| 19 | 0 | 1 | 0 | 1 | 2 |
| 20 | 0 | 1 | 1 | 0 | 1 |
| 21 | 0 | 1 | 1 | 1 | 1 |
| 22 | 1 | 0 | 0 | 0 | 2 |
| 23 | 1 | 0 | 0 | 1 | 2 |
| 24 | 1 | 0 | 1 | 0 | 1 |
| 25 | 1 | 0 | 1 | 1 | 2 |
| 26 | 1 | 1 | 0 | 0 | 0 |
| 27 | 1 | 1 | 0 | 1 | 0 |
| 28 | 1 | 1 | 1 | 0 | 0 |
| 29 | 1 | 1 | 1 | 1 | 0 |
| 30 | 2 | 0 | 0 | 0 | 0 |
| 31 | 2 | 0 | 0 | 1 | 2 |
| 32 | 2 | 0 | 1 | 0 | 1 |
| 33 | 2 | 0 | 1 | 1 | 1 |
| 34 | 2 | 1 | 0 | 0 | 0 |
| 35 | 2 | 1 | 0 | 1 | 0 |
| 36 | 2 | 1 | 1 | 0 | 0 |
| 37 | 2 | 1 | 1 | 1 | 0 |

It is obvious from the above descriptions and illustrations of two embodiments of the invention that truth tables and implementing hardware can be designed to provide a dynamic time slicing control for any number of devices to be serviced by Control Store 18.

One of the benefits of time slicing is that multiple control programs can exist in a single control storage facility yet be logically independent. Further, they may share common control programs. It is possible that all CSAR's could contain the same control store instruction address at some point in time. Taking this concept further, *n* identical devices, utilizing *n* time slices, can be controlled by a single control storage facility.

While the invention has been particularly shown and described with reference to preferred embodiments thereof, it will be understood by those skilled in the art that various changes in form and details may be made therein without departing from the spirit and scope of the invention.

We claim:

1. In a data processing system including a cyclically operating storage means containing a sequence of instructions for controlling the allocation of instruction cycles to service a plurality of dissimilar interrupts, the improvement comprising:

a. means coupled to said storage means and responsive to a first interrupt associated with a first device for dynamically assigning consecutive instruction cycles of said storage means to said first device; and b. means coupled to said storage means and responsive to the simultaneous occurrence of said first interrupt and a second or multiple interrupt associated with a second or multiple device for dynamically assigning alternate consecutive instruction cycles of said storage means to said first and second or multiple devices.

2. The improvement as defined in claim 1 further comprising means operatively connected to said storage means and responsive to the simultaneous occurrence of said first interrupt, said second interrupt and a plurality of other interrupts respectively associated with other devices for sequentially assigning consecutive instruction cycles of said storage means to said first, second and other devices.

3. The improvement as defined in claim 1 further comprising means coupled to said storage means for normally assigning consecutive instruction cycles of said storage means to said second device in the absence of said first and second interrupt commands.

4. In a data processing system including a cyclically operating storage means containing a sequence of instructions for controlling the operation of a plurality of devices, the improved method of assigning priorities to determine which device is to be serviced by the storage means comprising the steps of:

a. dynamically consecutive instruction cycles of said storage means to a first device in response to a high priority service request from said first device; and b. consecutive dynamically assigning alternate instruction cycles of said storage means to said first device and to a second device upon the simultaneous occurrence of high priority service requests from both said first and second devices.

5. The improved method as defined in claim 4 further comprising assigning consecutive instruction cycles of said storage means to one of said devices in the absence of high priority service requests from either of said devices.

6. The improved method as defined in claim 4 further comprising sequentially assigning consecutive instruction cycles of said storage means to said first and said second devices and to other devices upon the simultaneous occurrence of high priority service requests from said first, second and other devices.

7. In a data processing apparatus, a method for dynamically allocating instruction cycles to a plurality of addressing means for addressing an addressable storage unit in response to multiple interrupts having an unpredictable arrival pattern comprising:

circuits to electronically determining which of said plurality of addressing means is active during an instruction cycle, circuits to electronically determining the status of interrupts requesting instructions stored in said storage unit, and circuits to one of the addressing means to be used next based upon the results of determinations.

8. In a data processing system, apparatus for allocating instruction cycles selectively one at a time in sequence to one of a plurality of addressing means for addressing addressable storage means each addressing means being used for operating a logical program for servicing interrupts having a nonpredictable occurrence pattern comprising:

first sensing means operatively connected to said addressing means for determining which addressing means is currently active during each instruction cycle;

second sensing means for sensing interrupt request status during each instruction cycle; and third means for determining to which of said addressing means the next instruction cycle is to be assigned in response to the conditions sensed by said first and second sensing means.

* * * * *

PO-1050
(5/69)

UNITED STATES PATENT OFFICE
CERTIFICATE OF CORRECTION

Patent No. 3,766,524 Dated October 16, 1973

Inventor(s) Blayne E. Maring: James G. Nicholson; Lynn M. Rust

It is certified that error appears in the above-identified patent and that said Letters Patent are hereby corrected as shown below:

Column 1, Line 33, "ACcording" should be --According--.

Column 3, Line 56, "coni-" should be --coin---.

Column 4, Line 39, "ACTIVE" should be --time--.

Column 4, Line 53, "ACRIVE" should be --ACTIVE--.

Column 7, Line 25, Claim 4, after "dynamically" insert --assigning--.

Column 7, Line 28, Claim 4, instead of "consecutive dynamically assigning alternate" should read --dynamically assigning alternate consecutive--.

Signed and sealed this 25th day of June 1974.

(SEAL)
Attest:

EDWARD M.FLETCHER,JR.
Attesting Officer

C. MARSHALL DANN
Commissioner of Patents